US011334157B1

(12) United States Patent
Gong et al.

(10) Patent No.: US 11,334,157 B1
(45) Date of Patent: May 17, 2022

(54) WEARABLE DEVICE AND USER INPUT SYSTEM WITH ACTIVE SENSING FOR COMPUTING DEVICES AND ARTIFICIAL REALITY ENVIRONMENTS

(71) Applicant: Facebook Technologies, LLC, Menlo Park, CA (US)

(72) Inventors: Jun Gong, Redmond, WA (US); Aakar Gupta, Redmond, WA (US); Hrvoje Benko, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/829,933

(22) Filed: Mar. 25, 2020

Related U.S. Application Data

(60) Provisional application No. 62/939,559, filed on Nov. 22, 2019.

(51) Int. Cl.
| | |
|---|---|
| *G09G 5/00* | (2006.01) |
| *G06F 3/01* | (2006.01) |
| *G06F 3/16* | (2006.01) |
| *G06T 19/00* | (2011.01) |
| *H04B 11/00* | (2006.01) |
| *G02B 27/01* | (2006.01) |

(52) U.S. Cl.
CPC .............. *G06F 3/014* (2013.01); *G06F 3/017* (2013.01); *G06F 3/16* (2013.01); *G06T 19/006* (2013.01); *H04B 11/00* (2013.01); *G02B 27/017* (2013.01)

(58) Field of Classification Search
CPC .......... G06F 3/017; G06F 3/011; G06F 3/013; G06F 3/012
See application file for complete search history.

(56) References Cited

U.S. PATENT DOCUMENTS

| | | | |
|---|---|---|---|
| 2002/0135570 A1 | 9/2002 | Iisaka et al. | |
| 2012/0218228 A1* | 8/2012 | Payne | G06F 3/0423 345/175 |
| 2015/0258431 A1* | 9/2015 | Stafford | A63F 13/5255 463/31 |
| 2018/0129356 A1* | 5/2018 | Leigh | G06F 3/0436 |

OTHER PUBLICATIONS

Final Office Action dated Jun. 10, 2021 for U.S. Appl. No. 16/829,933, filed Mar. 25, 2020, 16 pages.
Non-Final Office Action dated Sep. 23, 2021 for U.S. Appl. No. 16/829,933, filed Mar. 25, 2020, 18 pages.

\* cited by examiner

*Primary Examiner* — Nan-Ying Yang
(74) *Attorney, Agent, or Firm* — FisherBroyles, LLP

(57) ABSTRACT

A wearable device and system for detecting data generated by a user's contact with a surface and using that data to determine that a user contacted the surface and, in some examples, the location of the contact. The location of the contact may then be used by another device, such as an artificial reality headset, to select a user interface element, activate a function or perform a task in an artificial reality environment, or execute another type of function typically performed in response to an input to a user interface. In one example, the wearable device includes an ultrasound transmitter (Tx) and an ultrasound receiver (Rx). In some embodiments, the wearable device may also include a processing element capable of processing the signals detected or received by the receiver to determine that a contact occurred.

20 Claims, 9 Drawing Sheets

WEARABLE DEVICE AND USER INPUT SYSTEM WITH ACTIVE SENSING FOR COMPUTING DEVICES AND ARTIFICIAL REALITY ENVIRONMENTS

CROSS REFERENCE TO RELATED APPLICATION

This application claims the benefit of U.S. Provisional Application No. 62/939,559, filed Nov. 22, 2019, the disclosure of which is incorporated, in its entirety, by this reference.

BRIEF DESCRIPTION OF THE DRAWINGS

The accompanying figures illustrate a number of exemplary embodiments and are a part of the specification. Together with the following description, these figures and description demonstrate and explain various principles of the present disclosure.

Figure 1A:
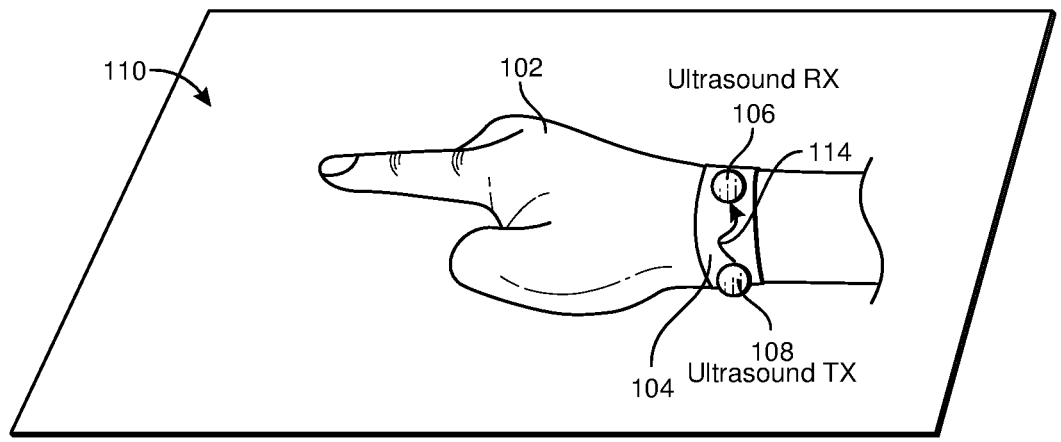
FIGS. 1A-1C are diagrams showing a use of an exemplary user input device in the form of a wristband to determine if a user contacted a surface.

Throughout the figures, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality (referring to a form of reality that has been adjusted in some manner before presentation to a user) is becoming a more and more popular way for users to interact with physical objects, imaginary and real environments, games, and with each other. A part of such interactions is the selection of a user interface element by a user, where conventionally, the selection is indicated by a user operating a controller. However, a disadvantage of relying on input from a controller when a user is experiencing an artificial reality environment is that it does not represent how users naturally interact with the real world or a virtual environment. As a result, use of a controller to indicate selection of a user interface element may be disruptive to a user's experience and in some cases is counter-intuitive. Artificial reality, as used herein, may include, for example, a virtual reality, an augmented reality, a mixed reality, a hybrid reality, or some combination and/or derivative thereof.

In various artificial reality experiences, it may be more natural for a user to contact a surface to indicate a choice or select an option. The contact may be in the form of a touch, tap, or similar action. In some cases, a user may desire to indicate a decision, configure a system, select a function, or select a user interface (UI) element by contacting a specific place on an object, on a surface, or even on their own skin or clothing. In some situations, both the act of the contact and its location are of importance to deciding what action the user desires or to determining how the artificial reality environment should respond to the user.

Because of the interest in providing users with a more natural and intuitive experience in an artificial reality environment, other ways of detecting a user's selection of a user interface element have been investigated and developed. These typically involve determining if a user has contacted a surface.

Some approaches to detecting that a user contacted a surface may include using an audio transducer to detect the sound generated by the contact or using a surface vibration transducer to detect the surface vibrations that occur when a user contacts the surface. However, both approaches may have disadvantages. The acoustic transducer approach may be susceptible to noise from environmental sources of noise and signal-to-noise discrimination problems. The surface vibration transducer approach may be affected by a user's coarse hand movements (e.g., a waving of their hand). These movements can introduce errors, and as a result, generate a false positive. In addition, a relatively light contact may not be detected due to the small amount of sound and/or vibration it generates.

Another form of detecting that a user has contacted a surface involves hand tracking, where a system or device attempts to determine that a user's hand has touched a surface or a specific region. Conventionally this is performed using optical imaging and image processing. However, this approach has the disadvantage that there is often uncertainty with regards to whether and/or when a user actually contacted a surface, whether a user instead was pointing at a surface, whether a user was actually touching a nearby surface, etc.

In many situations, detecting that a contact occurred, as well as determining the location of the contact, are important to deciding what action the user desires and determining how an artificial reality environment responds to the user. For contact localization or contact location determination, some approaches include instrumenting a surface with an accelerometer at each of four corners or instrumenting a device (e.g., a laptop or mobile phone) resting on a surface with a similar set of sensors. However, such approaches may limit the surfaces upon which contact can be detected and may also be a source of errors when vibrations that are not caused by a user's contact are detected.

In contrast to the approaches discussed above, embodiments of the present disclosure may provide a more natural alternative or supplement to using a controller to navigate an artificial reality environment, or to otherwise interact with a computing system. Embodiments may also provide increased precision in determining that a user contacted a surface compared to conventional approaches. Embodiments may enable any suitable surface (e.g., a table, clothing, an object, etc.) to function as an input device or surface for an artificial reality application. Some embodiments may also determine a location where the user is contacting an un-instrumented surface when the user's hand touches the surface by considering data or images obtained from an optical sensor that is part of a hand tracking system.

The present disclosure is generally directed to user interfaces, and more specifically, to improving how a user input is provided to a system or device. As will be explained in greater detail below, embodiments of the present disclosure may detect data generated by a user's contact with a surface and use that data to determine that a contact event occurred. In some embodiments, additional sensors or detectors (such as an optical imager or hand tracking system) may be used to better localize the position of the contact. The location of the contact may then be used by another device, such as an artificial reality (e.g., augmented or virtual reality) headset, to determine the user's desired selection of a user interface element, to activate a function or perform a task in the artificial reality environment, or perform another function typically initiated in response to an input to a user interface.

In one example, the present disclosure describes a user input device and system that overcomes the disadvantages of conventional controller-based user input devices, particularly for users engaged in experiencing an artificial reality environment. An exemplary user input system may include a wearable device, a transmitting component coupled to the wearable device and configured to transmit a signal along a surface, a receiving component coupled to the wearable device and configured to detect the signal, and a controller programmed to determine that a user contacted the surface by determining that the signal propagated from the transmitting component to the receiving component via an indirect path along the surface.

In some embodiments, additional data (e.g., an image, video, or other sensor data) may be used after confirmation of a user's contact with a surface to determine where on the surface the contact occurred. This information may be used to determine the user's desired action or selection of a user interface element.

The disclosure also describes a method. The method may include operating a first transmitter to transmit a signal, detecting a received signal corresponding to the transmitted signal at a receiver, determining that a user contacted a surface by determining that the signal propagated from the first transmitter to the receiver via an indirect path along the surface, and operating a second transmitter to transmit an indication that the user contacted the surface to a device, where the device uses the indication to determine the user's intended interaction with a user interface.

Embodiments of the present disclosure may provide improved methods and systems for enabling a user to indicate a desired action or intended interaction with a user interface as part of using an artificial reality application. Embodiments provide these improvements and accompany advantages in ways that are more consistent with a user's experience and desired interactions with an artificial reality environment. Embodiments also represent improvements to computing devices and systems by providing users with a more natural and effective way to indicate a desired action or intended interaction. This may improve the usefulness and portability of computing systems and devices and may be more convenient than using a controller-based input for some applications.

In one example, the described user input device may enable a user's contact with a surface to be determined accurately without disrupting their other activities. When combined with other data, the location of the contact may be determined and used to indicate a user's selection of a specific user interface element. This capability may be particularly important when a user is experiencing an artificial reality environment, where using a hand-held controller may be disruptive to how the user would normally interact with the environment. Embodiments may overcome disadvantages and limitations of conventional approaches by detecting a received signal or signals and using those to indicate a user's contact with a surface. Further, embodiments may combine that indication with additional data to determine a location of the contact. This approach may be both more accurate and less susceptible to background noise and other sources of error than conventional approaches.

The advantages and benefits of the embodiments described herein may include improving the operation of applications and computing devices by enabling a user selection to be determined without a hand-held controller. This enables a user to select a user interface element, or confirm a selection, in a way that is both untethered from a controller and more natural for use with certain applications, such as those used to generate and interact with an artificial reality environment.

Features of any of the embodiments mentioned herein may be used in combination with one another in accordance with the general principles described herein. These embodiments, features, and advantages will be more fully understood upon reading the detailed description in conjunction with the accompanying drawings and claims.

In some embodiments, the advantages and benefits described herein are obtained by an input device worn by a user that includes a transmitting component and a receiving component. In at least one embodiment, the transmitting component is an ultrasound transmitter and the receiving component is an ultrasound receiver. In some embodiments, the wearable device may perform some or all of the signal processing and/or logic used to determine that a contact occurred using an embedded controller. In some embodiments, the device may transmit data or signals to a processor or controller located in a different device, such as a mobile phone or artificial reality headset, for combining with other data, signal processing and/or the execution of logic.

One embodiment of the user input system may include an input device for artificial reality device users in the form of a wearable device. In one example, the device may be in the form of a wristband. In another example, the device may be in the form of a ring, badge, bracelet, or patch worn on a user's finger, hand, wrist, or arm. As will be described, for best operation, the placement of the input device on the user is preferably such that it can receive a signal from a transmitting component on the device that propagates along a surface and then back along the user's finger and hand to a receiving component on the device.

In some embodiments, the terms "transmitter" or "transmitting component" may refer to an element or component operable to transmit a signal, a pulse, or a waveform.

In some embodiments, the terms "receiver" or "receiving component" may refer to an element or component operable to receive or detect a signal, a pulse, or a waveform transmitted by the transmitting component.

In some embodiments, the term "controller" may refer to an element or component used for the execution of a set of computer-executable instructions. Examples of such elements or components include, but are not limited to, a processor, micro-controller, CPU, GPU, or FPGA.

In some embodiments, the term "user input" may refer to a user's action, the selection or indication of a user input element, or to the input of text or data into a user interface. Such user input or inputs may be provided to an artificial reality environment, a device, or a system to control or alter the operation of the environment, device, or system.

In some embodiments, the phrase "user's intended interaction with a user interface" may refer to a user's selection, indication, or identification of a user interface element. The phrase may also refer to a user's activation or initiation of a process or function resulting from a selection, indication, or identification of a user interface element. The phrase may also refer to a user's input of text or data into a user interface.

One embodiment of the wearable device described herein includes components comprising an ultrasound transmitter (Tx) and an ultrasound receiver (Rx). In this embodiment, the transmitter emits a signal that can be received by the receiver after propagation over one or both of two paths. A first path is a direct path between the transmitter and receiver, where both the transmitter and receiver are mounted on or are part of the wearable device. A second path is an indirect path in which a signal travels from the transmitter to a surface (either directly via contact with the surface or via a user's hand), along the surface to the user's finger in contact with the surface, and then back along the user's hand to the receiver.

Due to the greater time required for a signal to propagate along an indirect path compared to along a direct path, the time delay between the transmission of a signal and the detection of a signal at the receiver can be used to determine if a received signal propagated along an indirect path. If an indirect path signal is received, then it can be inferred that the user's hand was in contact with a surface. In another example, the receipt of two signals during a time interval or time window between consecutive transmitted signals can be interpreted as receipt of both the direct and indirect path signals, and hence an indication that contact with a surface occurred.

In some examples, additional sensor data obtained from a phone or headset camera, a hand tracking device, or a computer vision device may be used to determine the location of a user's contact with a surface when it is determined that a contact occurred. In this example, a contact detection signal generated by the user input device may cause the operation of a camera or optical sensor on a headset to capture an image of the user's hand. The image capture may be followed by suitable processing, such as by performing a detection or classification process, to better identify the location of the user's contact with the surface.

As noted, in one embodiment, the wearable device implements an active approach based on the transmission and reception of an ultrasound signal. In this embodiment, an ultrasound transmitter may be embedded on or in a portion of the wearable device. The transmitter may be positioned to be in direct or indirect contact with a surface. For example, the transmitter may be positioned on the bottom of a wristband or ring, or may be positioned to transmit a signal that propagates through a user's hand to a surface.

The transmitter may transmit a signal detected by a receiver placed on another portion of the device (for example, on the top of the wristband or ring). In one example, a received signal may travel along two paths: (1) a direct path to the ultrasound receiver through the user's hand and/or along the device and (2) an indirect path from the transmitter along a surface and then back along the user's finger and hand to the receiver on the device. Since the ultrasound receiver may receive signals from the two different paths, logic executed by the controller can be used to determine the existence of an indirect path signal and hence that a user contacted the surface.

In one example, a user wearing an embodiment of a user input device places the transmitter of the device or their hand in contact with a surface. A transmitted signal may propagate through the user's hand and/or across the device by a direct path. The receiver on the device may also receive a second signal propagating through or along the surface and then back to the receiver by way of the user's finger and hand (i.e., along the indirect path). It can be determined if there is a finger-surface contact by determining the existence (or lack) of the indirect path signal.

Figure 1B:
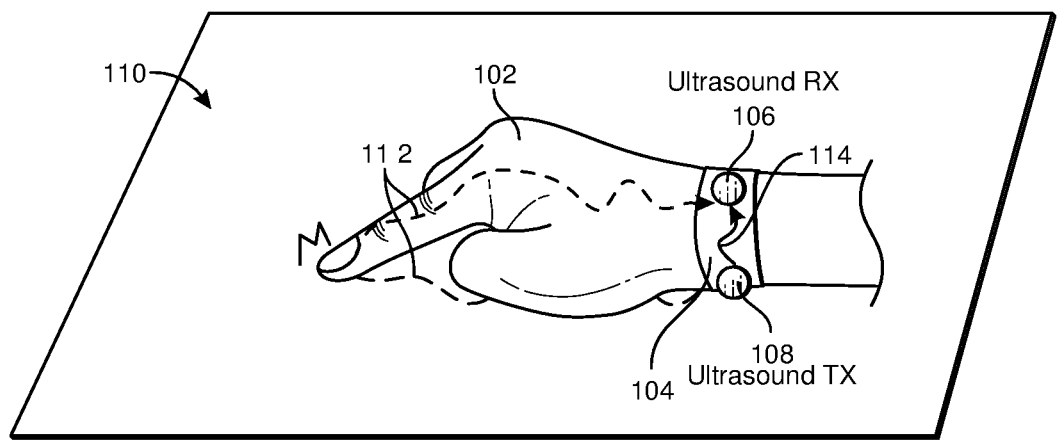
Figure 1C:
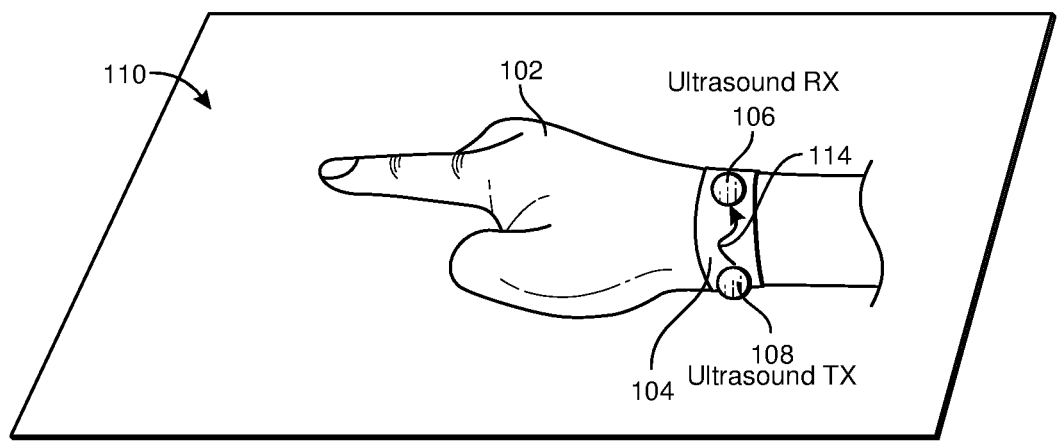
Figure 3:
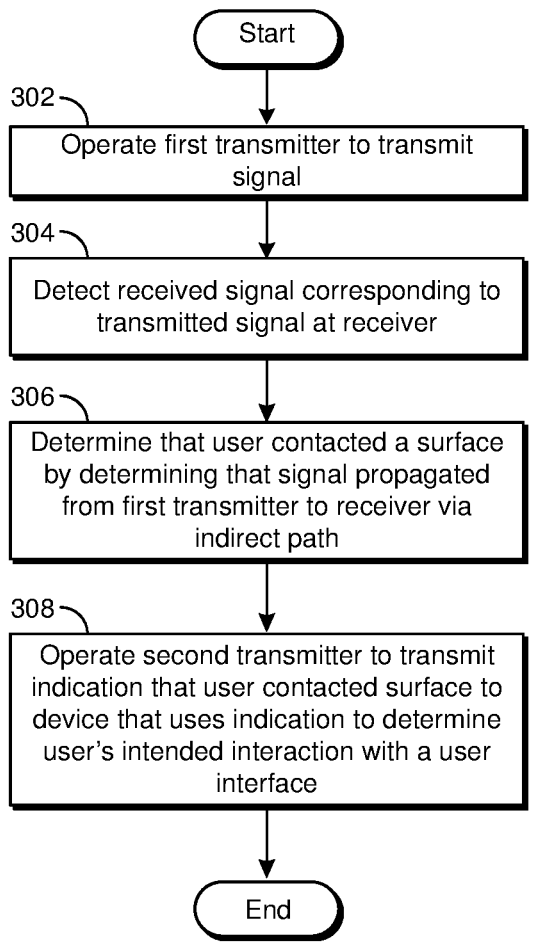
FIG. 3 is a flowchart or flow diagram illustrating the operation of a user input device and the computer-implemented processing of the detected signals to determine if a user wearing the wristband of FIGS. 1A-1C contacted a surface.

An example of this active embodiment is illustrated in FIGS. 1A-1C, which are diagrams showing a use of an exemplary user input device in the form of a wristband to determine if a user contacted a surface. FIG. 3 is a flowchart or flow diagram illustrating the operation of a user input device and the computer-implemented processing of the detected signals to determine if a user wearing the wristband of FIGS. 1A-1C contacted a surface.

The following will provide, with reference to FIGS. 1-9, detailed descriptions of the disclosed user input system and device, along with its operation and use with a computing system or artificial reality headset. These figures, alone or in combination, provide illustrations of an example operational environment and the structure and operation of one or more embodiments of the user input system described herein. The figures provide examples of how an embodiment may be used as part of an artificial reality environment or application, as well as a more general computing system.

Referring to FIGS. 1A-1C, a user input device is illustrated in the form of a wristband 104 worn by a user 102, although as noted, other forms of wearable devices may also be used. In one embodiment, device 104 includes an ultrasound receiver (Rx) 106 and an ultrasound transmitter (Tx) 108. In some embodiments, the operation of the input device relies on the transmitter being in contact with a surface and also that the user's finger is in contact with the surface to provide an indirect signal return path.

In one example of the operation of the system, the user places their hand or wrist on a surface 110 so that the transmitter 108 is in contact with the surface, as shown in FIG. 1A. The user than contacts the surface with a finger to indicate a choice or desired function, as shown in FIG. 1B. Because transmitter 108 is in contact with surface 110, the operation of the transmitter in conjunction with the user's contact enables a transmitted signal to travel along two paths: a direct path 114 and an indirect path 112. Note that in FIG. 1A, since the user's finger is not yet in contact with surface 110, a transmitted signal only travels along direct path 114. If the transmitter is not in direct contact with the surface, then a transmitted signal may still reach the surface by propagating through the user's hand.

A signal propagating along indirect path 112 may travel from transmitter 108 along (or in) the surface 110 to the user's finger in contact with the surface and up the user's finger and hand to receiver 106. Because the user's finger is in contact with the surface, the transmitted signal can return to the receiver via the indirect path. This allows the detection of an indirect path signal to be used to confirm that a user contacted a surface. Surface 110 may be, for example, a table, an item of clothing worn by the user, a book, a door, a window, etc. After the user finishes contact with the surface and lifts their finger, only a direct path remains for signal propagation between the transmitter 108 and the receiver 106, as shown in FIG. 1C.

As described, an emitted signal from transmitter 108 can cause two signals to be received at the receiver: a first signal propagating directly from transmitter 108 to receiver 106 and a second signal propagating from transmitter 108 along the surface to the user's finger and then up the user's finger and hand to the receiver 106.

Figure 2:
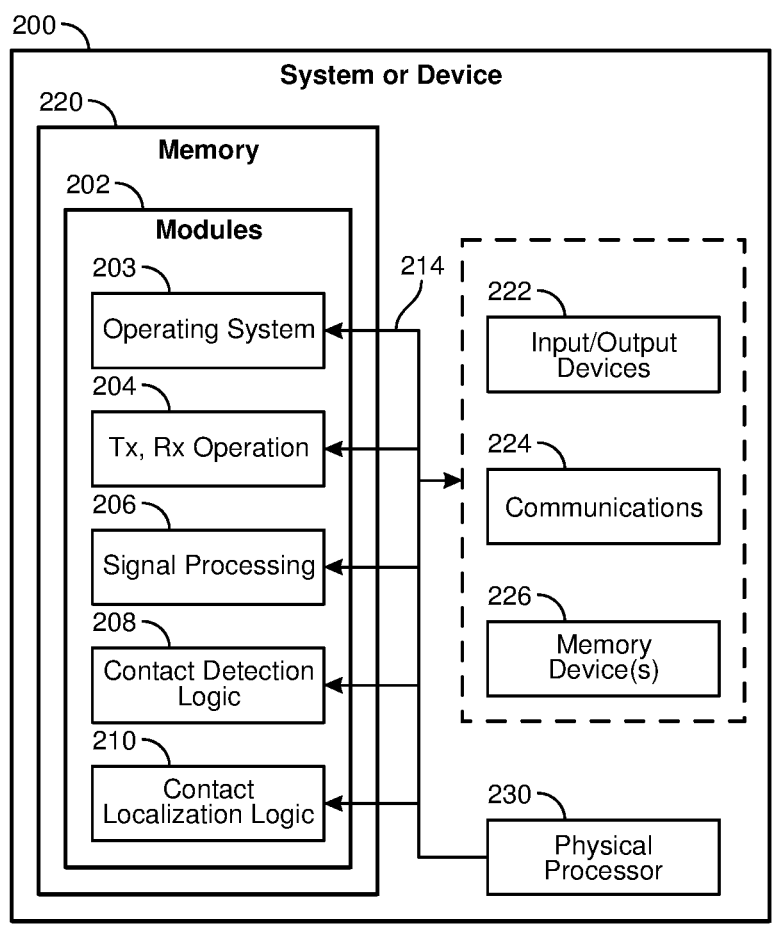
FIG. 2 is a block diagram of an exemplary system or device for implementing an embodiment of the user interface system described herein.

FIG. 2 is a block diagram of an exemplary system or device 200 for implementing an embodiment of the user interface system described herein. As shown, system or device 200 includes a set of modules 202, with each module containing instructions that when executed by an electronic processor (such as a controller) implement a function or operation described herein. Some or all of the elements of system or device 200 may be present in a wristband, bracelet, ring, badge, patch, headset, mobile phone or other component capable of computing or data processing operations. For example, one or more of the modules illustrated may contain instructions executed by a processor or controller that is part of a wearable device. Similarly, one or more of the modules illustrated may contain instructions executed by a processor or controller that is part of an artificial reality headset or mobile device.

Modules 202 each contain a set of computer-executable instructions, where when the set of instructions is executed by a suitable electronic processor (e.g., a controller such as that indicated in the figure by "Physical Processor(s) 230"), system or device 200 operates to perform a specific process, operation, function or method. Modules 202 are stored in a memory 220, which typically includes an operating system module 203 that contains instructions used (among other functions) to access and control the execution of the instructions contained in other modules. The modules 202 in memory 220 are accessed for purposes of transferring data and executing instructions by use of a "bus" or communications line 214, which also serves to permit processor(s) 230 to communicate with the modules for purposes of accessing and executing a set of instructions. Bus or communications line 214 also permits processor(s) 230 to interact with other elements of system 200, such as input or output devices 222, communications elements 224 for exchanging data and information with devices external to system or device 200, and additional memory devices 226.

As shown in FIG. 2, modules 202 may contain one or more sets of instructions for performing the methods described herein and with reference to FIG. 3. These modules may include those illustrated but may also include a greater number or fewer number than those illustrated. For example, Tx, Rx Operation Module 204 may contain instructions that when executed perform a process to operate an ultrasound transmitter to emit a signal and to detect a signal or signals using an ultrasound receiver. Similarly, Signal Processing Module 206 may contain instructions that when executed perform a process to perform signal processing operations on the signals received (such as gating of received signals, performing a transform on a signal, determining a time delay between a transmitted signal and a received signal, etc.). The signal processing may be used to provide data used by Contact Detection Logic Module 208 to determine if contact with a surface occurred and/or by Contact Localization Logic Module 210 to determine a location of a contact that occurred.

As mentioned, in some embodiments, additional sensors or detectors may be used to determine the location of a user's contact with a surface. Such additional sensors may include an image capture sensor, a video capture sensor, a hand tracking sensor that is capable of determining the location of a user's fingers using an optical sensor or radar, etc. Each such sensor may provide additional signals or data. In some embodiments, the additional signals or data may be acquired in response to a signal generated after confirmation of a user's contact with a surface. The additional signals or data may be processed to determine the location of the contact and as a result, the user's desired input or interaction with a user interface.

FIG. 3 is a flowchart or flow diagram illustrating the operation of a user input device and the computer-implemented processing of the detected signals to determine if a user wearing the wristband of FIGS. 1A-1C contacted a surface. In one example, a user wearing an embodiment of the user input device of FIG. 1A contacts a surface with their finger.

At some point a first transmitter, for example, an ultrasound transmitter on the wearable device, emits a signal, sometimes referred to as a "chirp," as suggested by step 302. Emission of the signal may be triggered or initiated by one of several events, including, but not limited to, contact with the surface, a detected user wrist motion, or the expiration of a timer. In one example, the signal may be emitted continuously by the transmitter. After the signal is emitted, a receiver, for example, the ultrasound receiver on the device, receives or detects a signal (step 304). The received signal may be one that propagated along a direct path or one that propagated along an indirect path. In some embodiments, the two paths may be distinguished because they have different propagation times. In other words, the time period between when a signal is transmitted and when a received signal is detected may be different for the two paths. This is typically a result of the difference in the path lengths for the signal received via the direct path and for the signal received via the indirect path. It may also result from the material or materials from which a surface is made, as those may impact the propagation characteristics for a signal.

A decision process performed by a set of instructions executed by a controller or other form of processor determines if the received signal corresponds to a signal traveling along the indirect path between the transmitter and receiver (step 306), and hence that the user contacted a surface. If the logic determines that the user contacted a surface, then a second transmitter is operated to transmit an indication that the user contacted the surface to a device that uses this information to determine the user's intended interaction with a user interface (step 308). The second transmitter may be part of the wearable device but operate in a different frequency range than the first transmitter. The second transmitter may transmit the indication to an external device, such as a mobile phone or artificial reality headset.

Knowing that the user contacted a surface, the artificial reality headset may cause the operation of a sensor to acquire data used to determine the location of where the contact with the surface occurred. Based on knowing that a contact occurred, alone or in combination with the location of the contact, the artificial reality headset may determine the user's desired interaction with a user interface. This may include a user's input of text or data, a user's confirmation of an action or selection, a user's selection of an interface element, a user's desired interaction with virtual reality content or a virtual reality environment, etc. In response to determining the user's desired interaction with a user interface, the headset may alter the virtual reality environment experienced by the user. This may include changing the appearance of the environment, activating a portion of the experience, adding or removing a feature or capability of the user in the environment, etc.

Determining that contact with a surface occurred may also be performed by detection of two signals, one being a signal that propagated along the direct path and the second being a signal that propagated along the indirect path. This may involve logic that determines whether a second signal was received after reception of a first signal. It may also be determined by reception of a second signal after reception of a first signal, but prior to transmission of a new signal. In one embodiment, the logic may be aware of when the transmitter emitted a first signal. It may also be aware how long it takes a signal to propagate along the direct path from the transmitter to the receiver. If the receiver receives a second signal after receipt of the first signal and before another signal is transmitted, then the logic can conclude that the second signal is due to the transmitted signal travelling along the indirect path.

As described, in one embodiment, a user input system relies on the detection of a signal that propagated along an indirect path to determine that a user contacted a surface. This method may be combined with other sensor inputs to determine the location of where a user contacted the surface. Based on where a user contacted the surface, the system or another device may be able to determine a user's intended interaction with a user interface, where this interaction may be a selection of a user interface element, input of data, activation of a function or application, etc.

There are multiple ways to determine the location of where a user contacted a surface that may be used as part of an embodiment of the disclosure. For example, in one embodiment, multiple pulses or pulses emitted by different transmitters (or by transmitters operating at different frequencies) may be used in a form of direction-finding to determine the location of a contact or to determine the direction from which a signal was generated. In another embodiment, a computer vision system that analyzes data acquired by an optical sensor (camera, video, hand tracking, etc.) may be used to determine the location of a user's finger on a surface. In another embodiment, a device that emits radar signals may be used as part of a system to track a user's fingers and determine the location of a contact.

In one embodiment, the frequency of a transmitted ultrasound signal is in a range between 100 kHz and 1 MHz (i.e., 100 kHz, 200 kHz, 500 kHz, etc.). This is at least partly because if the signal's frequency is substantially above 1 MHz, then the signal's attenuation when traversing the indirect path may be too great to be reliably detected by the receiver. Conversely, if the signal's frequency is substantially lower than 100 KHz, then the resolution desired to clearly discriminate between a signal that propagated along the direct path and a signal that propagated along the indirect path may not be achievable.

It is noted that the material or materials from which a surface is constructed may influence the operation of an embodiment of the system and device disclosed. For example, the described sensing approach is expected to perform better for a surface made of metal than one made of wood because the attenuation factor of metal in the ultrasound frequency range is less than that of wood.

An advantage of the described approach is its reliability. The use of ultrasound is expected to be immune from environmental noises and won't be affected by a user's body or hand movements. Further, this approach does not rely on an audio signal generated when a user contacts a surface. This is an advantage because an audio signal might be more difficult to detect when a contact is subtle or occurs in a noisy environment. Instead, the described approach detects the existence of an indirect path signal to determine if a user's hand or finger is in contact with a surface.

A certain amount of signal processing and decision logic is used in the described embodiments of the user input system and wearable device. The device or devices in which the signal processing and/or logic is implemented may vary, depending on the embodiment or on the implementation of the embodiment.

Figure 4:
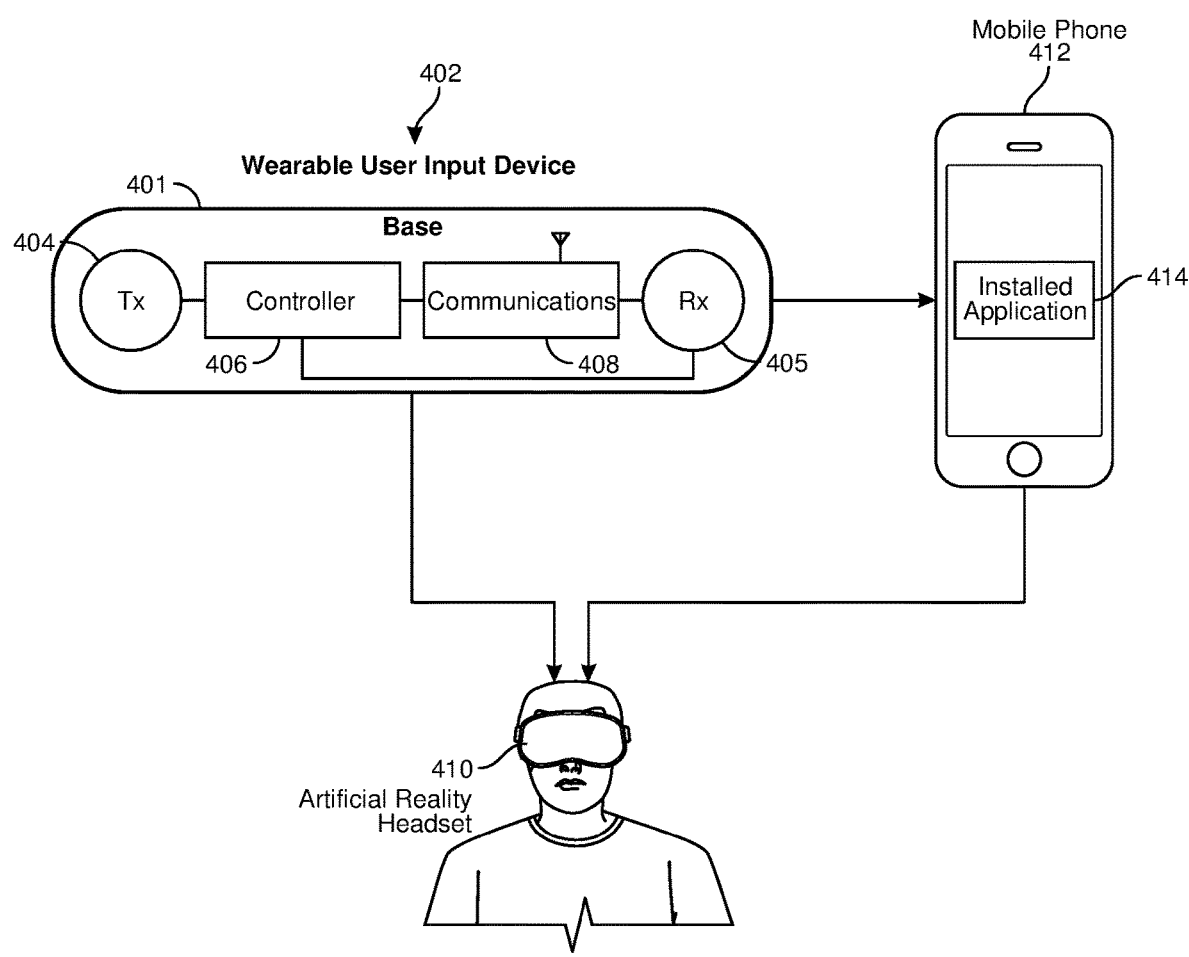
FIG. 4 is a diagram of an exemplary environment in which embodiments of the user interface system described herein may be implemented.

As an example, FIG. 4 is a diagram of an exemplary environment in which embodiments of the user interface system described herein may be implemented. As shown, user input device 402 may include a transmitter Tx 404 and a receiver Rx 405, with both Tx and Rx mounted or connected to a base 401. Device 402 may also include an on-device electronic controller or other form of processor 406. Controller 406 may be programmed with a set of instructions. When executed, the instructions may cause device 402 to perform signal processing and/or decision operations. Controller 406 may be coupled to communications element 408. Communications element 408 may be capable of wirelessly communicating with a second device, such as an artificial reality headset 410. This combination of functions or elements enables device 402 to detect signals, perform processing on those signals, make one or more decisions based on the processed signals, and then communicate the result of those decisions to a second device (in this example, the headset).

In some examples, the second device may be a mobile phone 412, in which is installed an application 414. Application 414 may be used to perform some (or in some cases, all) of the signal processing or decision operations instead of (or in addition to) those being performed by device 402. In such a situation, application 414 may cause mobile phone 412 to transmit the results of those signal processing and/or decision operations to headset 410.

In some versions or embodiments, a signal processing algorithm may be used to determine if a received signal has undergone a phase shift. This may be indicative of the material being touched by the user and/or a position on the surface being touched by a user. For example, if the surface has sections composed of different materials, each with different signal attenuation/transmission properties, then the phase shift of a received signal may allow a determination of which section was contacted by a user. This is at least partially because the type of material from which a surface is constructed can influence the attenuation, propagation, and phase properties of a signal.

In some versions or embodiments, a relatively narrow bandwidth, high-frequency signal may be transmitted by the transmitter that is part of the wearable device. A single pulse may be emitted, sometimes referred to as a "chirp" signal or pulse.

If the properties of the received signal are used to determine a characteristic or characteristics of the surface, then the transmitter operating characteristics may be adjusted to improve performance and increase the accuracy of the detection of the indirect path signal (such as by altering frequency, pulse-width, a gating window, etc.).

In some embodiments, multiple sensor types (operating as a transmitter and/or receiver) may be used to determine characteristics of a surface or improve the localization of the contact. In one example, a microphone may be used to detect the sound generated by a user's contact with a surface. Detection of the sound may be used to confirm that a contact occurred. Detection of the sound generated by the contact may also or instead assist in determining the location of the contact using a process that determines the direction from which the sound was generated. In another example, the sound of the contact may assist in determining the composition of the surface, as different materials will generate different sounds when contacted based on their density and other characteristics.

In some embodiments, a trained machine learning model may be used to classify an environment or surface based on one or more of sound, appearance, conductivity or other factor, and use that information to adjust or modify the characteristics of the transmitted signal. In one example, a trained model may receive as input(s) one or more of a sample of a sound generated when a surface is contacted, an image of a surface, or a measurement of a characteristic of a received signal that has propagated along the surface and in response identify the surface or the material from which the surface is made. Using the identification of the surface or material, the transmitted signal may be altered with regards to its frequency, pulse shape, bandwidth, power, or another characteristic so that it propagates with less signal loss and can be detected more readily at the receiver.

In some versions, different user gestures may be able to be discriminated and in response, reacted to by an artificial reality system in a way dependent upon the gesture. The different user gestures may be able to be discriminated by a combination of sensor inputs, such as optical and ultrasound. For example, in one embodiment, the system described herein may identify a user's gesture as a tapping action and respond by selecting the user interface element the user contacted. Selection of the user interface element may cause a change to a character or other aspect of an artificial reality environment. In another embodiment, the system described may identify a user's gesture as pointing at a location or object. In response, the artificial reality system may cause the location or object to change its characteristics as experienced by the user in the artificial reality environment.

By using an embodiment of the described device and associated signal processing, any suitable surface (e.g., table, object, clothing, etc.) may function as a user input surface for an artificial reality application. For example, a user may tap on a table or their clothing to confirm or decline messages from an application. This is particularly helpful to a user who is "immersed" in a different environment.

Another use case is for a user to place their non-dominant hand (e.g., the hand wearing the device) on a surface and contact the surface using the other hand. As with the other embodiments described, the contact can be detected and localized.

In another variation, an optical flow sensor may be combined with other sensors to provide enhanced performance. An optical flow sensor may be a vision sensor capable of measuring optical flow or visual motion and outputting a measurement based on the sensed optical flow. Such a sensor could be used to detect a hand motion or hand resting location and provide inputs to a process that determines if a contact occurred and/or the location of a contact on a surface.

The embodiments described herein are directed to a user input device and system that overcomes the disadvantages of conventional controller-based user input devices, particularly for users engaged in experiencing an artificial reality environment. An example of the user input system may include a wearable device having a transmitter, a receiver, and a controller. The controller may operate to determine that a signal transmitted by the transmitter propagated via an indirect path along a surface before being received by the receiver. Confirmation that the user contacted a surface may be used by another device to determine the user's intended interaction with a user interface. The user's intended interaction may then be used to alter the user's experience in the artificial reality environment.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 500 in FIG. 5) or that visually immerses a user in an artificial reality (such as, e.g., virtual-reality system 600 in FIG. 6). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 5:
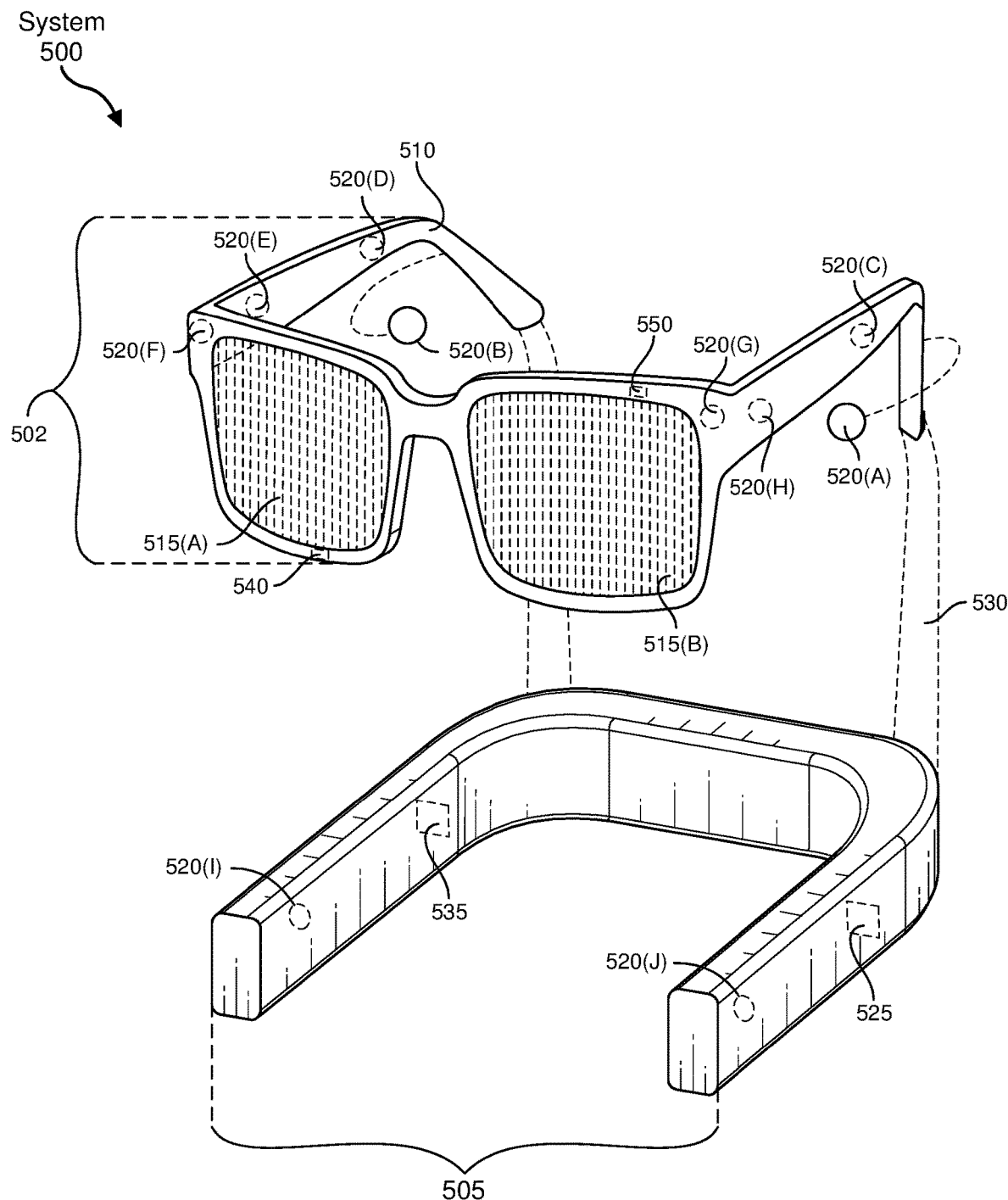
FIG. 5 is an illustration of exemplary augmented-reality glasses that may be used in connection with embodiments of this disclosure.

Turning to FIG. 5, augmented-reality system 500 may include an eyewear device 502 with a frame 510 configured to hold a left display device 515(A) and a right display device 515(B) in front of a user's eyes. Display devices 515(A) and 515(B) may act together or independently to present an image or series of images to a user. While augmented-reality system 500 includes two displays, embodiments of this disclosure may be implemented in augmented-reality systems with a single NED or more than two NEDs.

In some embodiments, augmented-reality system 500 may include one or more sensors, such as sensor 540. Sensor 540 may generate measurement signals in response to motion of augmented-reality system 500 and may be located on substantially any portion of frame 510. Sensor 540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 500 may or may not include sensor 540 or may include more than one sensor. In embodiments in which sensor 540 includes an IMU, the IMU may generate calibration data based on measurement signals from sensor 540. Examples of sensor 540 may include, without limitation, accelerometers, gyroscopes, magnetometers, other suitable types of sensors that detect motion, sensors used for error correction of the IMU, or some combination thereof.

In some examples, augmented-reality system 500 may also include a microphone array with a plurality of acoustic transducers 520(A)-520(J), referred to collectively as acoustic transducers 520. Acoustic transducers 520 may represent transducers that detect air pressure variations induced by sound waves. Each acoustic transducer 520 may be configured to detect sound and convert the detected sound into an electronic format (e.g., an analog or digital format). The microphone array in FIG. 6 may include, for example, ten acoustic transducers: 520(A) and 520(B), which may be designed to be placed inside a corresponding ear of the user, acoustic transducers 520(C), 520(D), 520(E), 520(F), 520 (G), and 520(H), which may be positioned at various locations on frame 510, and/or acoustic transducers 520(1) and 520(J), which may be positioned on a corresponding neckband 505.

In some embodiments, one or more of acoustic transducers 520(A)-(F) may be used as output transducers (e.g., speakers). For example, acoustic transducers 520(A) and/or 520(B) may be earbuds or any other suitable type of headphone or speaker.

The configuration of acoustic transducers 520 of the microphone array may vary. While augmented-reality system 500 is shown in FIG. 5 as having ten acoustic transducers 520, the number of acoustic transducers 520 may be greater or less than ten. In some embodiments, using higher numbers of acoustic transducers 520 may increase the amount of audio information collected and/or the sensitivity and accuracy of the audio information. In contrast, using a lower number of acoustic transducers 520 may decrease the computing power required by an associated controller 550 to process the collected audio information. In addition, the position of each acoustic transducer 520 of the microphone array may vary. For example, the position of an acoustic transducer 520 may include a defined position on the user, a defined coordinate on frame 510, an orientation associated with each acoustic transducer 520, or some combination thereof.

Acoustic transducers 520(A) and 520(B) may be positioned on different parts of the user's ear, such as behind the pinna, behind the tragus, and/or within the auricle or fossa. Or, there may be additional acoustic transducers 520 on or surrounding the ear in addition to acoustic transducers 520 inside the ear canal. Having an acoustic transducer 520 positioned next to an ear canal of a user may enable the microphone array to collect information on how sounds arrive at the ear canal. By positioning at least two of acoustic transducers 520 on either side of a user's head (e.g., as binaural microphones), augmented-reality device 500 may simulate binaural hearing and capture a 3D stereo sound field around about a user's head. In some embodiments, acoustic transducers 520(A) and 520(B) may be connected to augmented-reality system 500 via a wired connection 530, and in other embodiments acoustic transducers 520(A) and 520(B) may be connected to augmented-reality system 500 via a wireless connection (e.g., a Bluetooth connection). In still other embodiments, acoustic transducers 520(A) and 520(B) may not be used at all in conjunction with augmented-reality system 500.

Acoustic transducers 520 on frame 510 may be positioned in a variety of different ways, including along the length of the temples, across the bridge, above or below display devices 515(A) and 515(B), or some combination thereof. Acoustic transducers 520 may also be oriented such that the microphone array is able to detect sounds in a wide range of directions surrounding the user wearing the augmented-reality system 500. In some embodiments, an optimization process may be performed during manufacturing of augmented-reality system 500 to determine relative positioning of each acoustic transducer 520 in the microphone array.

In some examples, augmented-reality system 500 may include or be connected to an external device (e.g., a paired device), such as neckband 505. Neckband 505 generally represents any type or form of paired device. Thus, the following discussion of neckband 505 may also apply to various other paired devices, such as charging cases, smart watches, smart phones, wrist bands, other wearable devices, hand-held controllers, tablet computers, laptop computers, other external compute devices, etc.

As shown, neckband 505 may be coupled to eyewear device 502 via one or more connectors. The connectors may be wired or wireless and may include electrical and/or non-electrical (e.g., structural) components. In some cases, eyewear device 502 and neckband 505 may operate independently without any wired or wireless connection between them. While FIG. 5 illustrates the components of eyewear device 502 and neckband 505 in example locations on eyewear device 502 and neckband 505, the components may be located elsewhere and/or distributed differently on eyewear device 502 and/or neckband 505. In some embodiments, the components of eyewear device 502 and neckband 505 may be located on one or more additional peripheral devices paired with eyewear device 502, neckband 505, or some combination thereof.

Pairing external devices, such as neckband 505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 500 may be provided by a paired device or shared between a paired device and an eyewear device, thus reducing the weight, heat profile, and form factor of the eyewear device overall while still retaining desired functionality. For example, neckband 505 may allow components that would otherwise be included on an eyewear device to be included in neckband 505 since users may tolerate a heavier weight load on their shoulders than they would tolerate on their heads. Neckband 505 may also have a larger surface area over which to diffuse and disperse heat to the ambient environment. Thus, neckband 505 may allow for greater battery and computation capacity than might otherwise have been possible on a stand-alone eyewear device. Since weight carried in neckband 505 may be less invasive to a user than weight carried in eyewear device 502, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 505 may be communicatively coupled with eyewear device 502 and/or to other devices. These other devices may provide certain functions (e.g., tracking, localizing, depth mapping, processing, storage, etc.) to augmented-reality system 500. In the embodiment of FIG. 5, neckband 505 may include two acoustic transducers (e.g., 520(1) and 520(J)) that are part of the microphone array (or potentially form their own microphone subarray). Neckband 505 may also include a controller 525 and a power source 535.

Acoustic transducers 520(1) and 520(J) of neckband 505 may be configured to detect sound and convert the detected sound into an electronic format (analog or digital). In the embodiment of FIG. 5, acoustic transducers 520(1) and 520(J) may be positioned on neckband 505, thereby increasing the distance between the neckband acoustic transducers 520(1) and 520(J) and other acoustic transducers 520 positioned on eyewear device 502. In some cases, increasing the distance between acoustic transducers 520 of the microphone array may improve the accuracy of beamforming performed via the microphone array. For example, if a sound is detected by acoustic transducers 520(C) and 520(D) and the distance between acoustic transducers 520(C) and 520(D) is greater than, e.g., the distance between acoustic transducers 520(D) and 520(E), the determined source location of the detected sound may be more accurate than if the sound had been detected by acoustic transducers 520(D) and 520(E).

Controller 525 of neckband 505 may process information generated by the sensors on neckband 505 and/or augmented-reality system 500. For example, controller 525 may process information from the microphone array that describes sounds detected by the microphone array. For each detected sound, controller 525 may perform a direction-of-arrival (DOA) estimation to estimate a direction from which the detected sound arrived at the microphone array. As the microphone array detects sounds, controller 525 may populate an audio data set with the information. In embodiments in which augmented-reality system 500 includes an inertial measurement unit, controller 525 may compute all inertial and spatial calculations from the IMU located on eyewear device 502. A connector may convey information between augmented-reality system 500 and neckband 505 and between augmented-reality system 500 and controller 525. The information may be in the form of optical data, electrical data, wireless data, or any other transmittable data form. Moving the processing of information generated by augmented-reality system 500 to neckband 505 may reduce weight and heat in eyewear device 502, making it more comfortable to the user.

Power source 535 in neckband 505 may provide power to eyewear device 502 and/or to neckband 505. Power source 535 may include, without limitation, lithium ion batteries, lithium-polymer batteries, primary lithium batteries, alkaline batteries, or any other form of power storage. In some cases, power source 535 may be a wired power source. Including power source 535 on neckband 505 instead of on eyewear device 502 may help better distribute the weight and heat generated by power source 535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 600 in FIG. 6, that mostly or completely covers a user's field of view. Virtual-reality system 600 may include a front rigid body 602 and a band 604 shaped to fit around a user's head. Virtual-reality system 600 may also include output audio transducers 606(A) and 606(B). Furthermore, while not shown in FIG. 6, front rigid body 602 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 500 and/or virtual-reality system 600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 500 and/or virtual-reality system 600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 500 and/or virtual-reality system 600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 500 and 600 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 7:
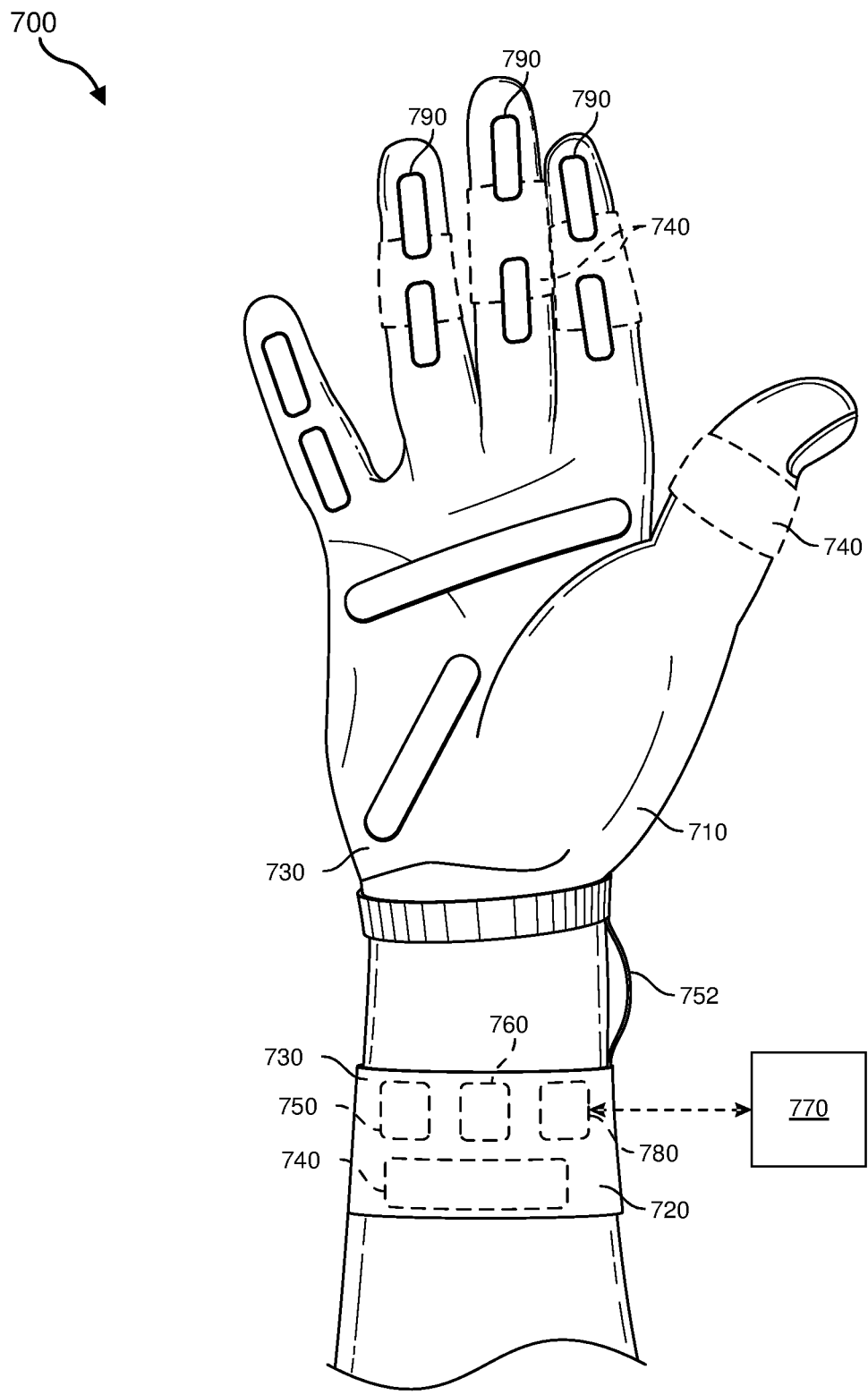
FIG. 7 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 7 illustrates a vibrotactile system 700 in the form of a wearable glove (haptic device 710) and wristband (haptic device 720). Haptic device 710 and haptic device 720 are shown as examples of wearable devices that include a flexible, wearable textile material 730 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 740 may be positioned at least partially within one or more corresponding pockets formed in textile material 730 of vibrotactile system 700. Vibrotactile devices 740 may be positioned in locations to provide a vibrating sensation (e.g., haptic feedback) to a user of vibrotactile system 700. For example, vibrotactile devices 740 may be positioned against the user's finger(s), thumb, or wrist, as shown in FIG. 7. Vibrotactile devices 740 may, in some examples, be sufficiently flexible to conform to or bend with the user's corresponding body part(s).

A power source 750 (e.g., a battery) for applying a voltage to the vibrotactile devices 740 for activation thereof may be electrically coupled to vibrotactile devices 740, such as via conductive wiring 752. In some examples, each of vibrotactile devices 740 may be independently electrically coupled to power source 750 for individual activation. In some embodiments, a processor 760 may be operatively coupled to power source 750 and configured (e.g., programmed) to control activation of vibrotactile devices 740.

Vibrotactile system 700 may be implemented in a variety of ways. In some examples, vibrotactile system 700 may be a standalone system with integral subsystems and components for operation independent of other devices and systems. As another example, vibrotactile system 700 may be configured for interaction with another device or system 770. For example, vibrotactile system 700 may, in some examples, include a communications interface 780 for receiving and/or sending signals to the other device or system 770. The other device or system 770 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 780 may enable communications between vibrotactile system 700 and the other device or system 770 via a wireless (e.g., Wi-Fi, Bluetooth, cellular, radio, etc.) link or a wired link. If present, communications interface 780 may be in communication with processor 760, such as to provide a signal to processor 760 to activate or deactivate one or more of the vibrotactile devices 740.

Vibrotactile system 700 may optionally include other subsystems and components, such as touch-sensitive pads 790, pressure sensors, motion sensors, position sensors, lighting elements, and/or user interface elements (e.g., an on/off button, a vibration control element, etc.). During use, vibrotactile devices 740 may be configured to be activated for a variety of different reasons, such as in response to the user's interaction with user interface elements, a signal from the motion or position sensors, a signal from the touch-sensitive pads 790, a signal from the pressure sensors, a signal from the other device or system 770, etc.

Although power source 750, processor 760, and communications interface 780 are illustrated in FIG. 7 as being positioned in haptic device 720, the present disclosure is not so limited. For example, one or more of power source 750, processor 760, or communications interface 780 may be positioned within haptic device 710 or within another wearable textile.

Figure 8:
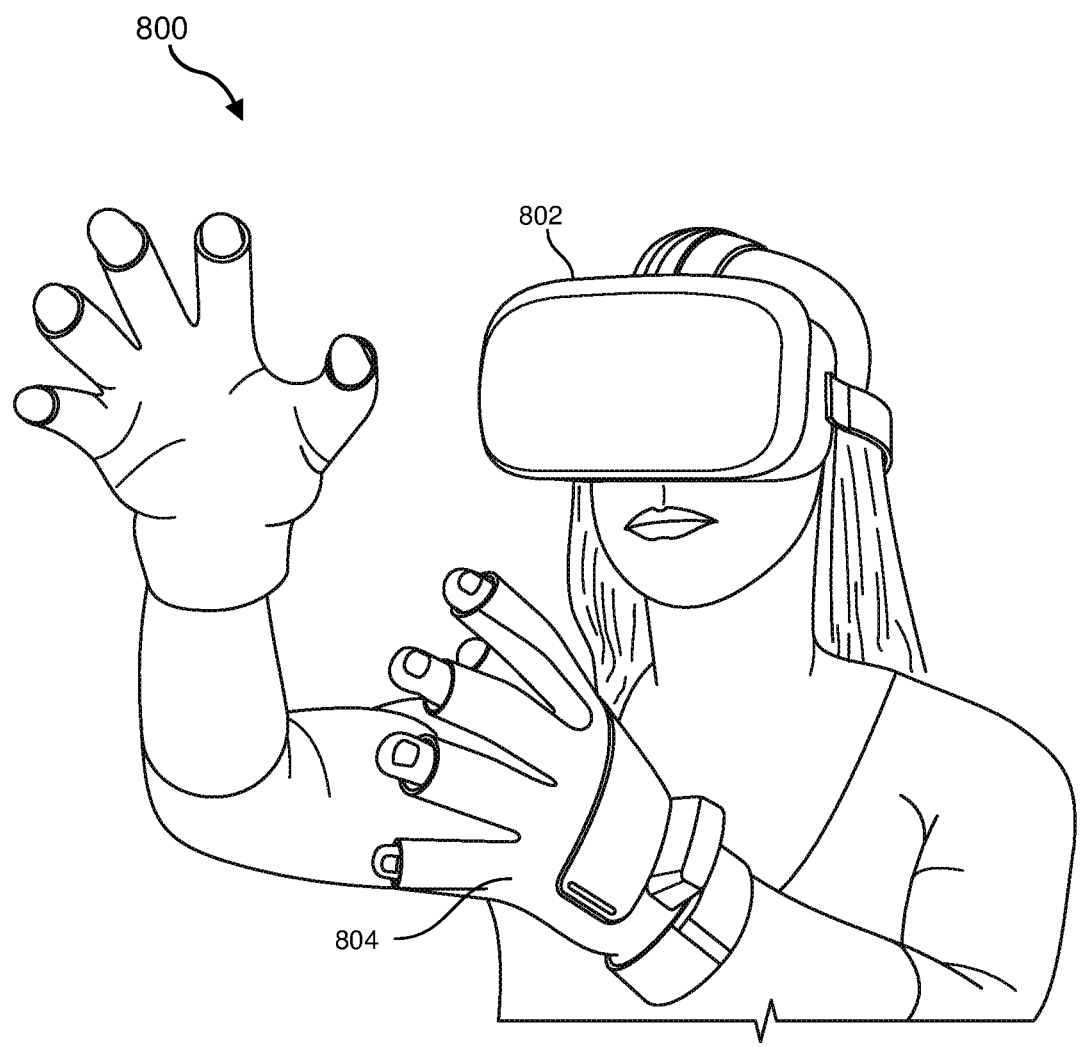
FIG. 8 is an illustration of an exemplary virtual-reality environment according to embodiments of this disclosure.

Haptic wearables, such as those shown in and described in connection with FIG. 7, may be implemented in a variety of types of artificial-reality systems and environments. FIG. 8 shows an example artificial-reality environment 800 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 6:
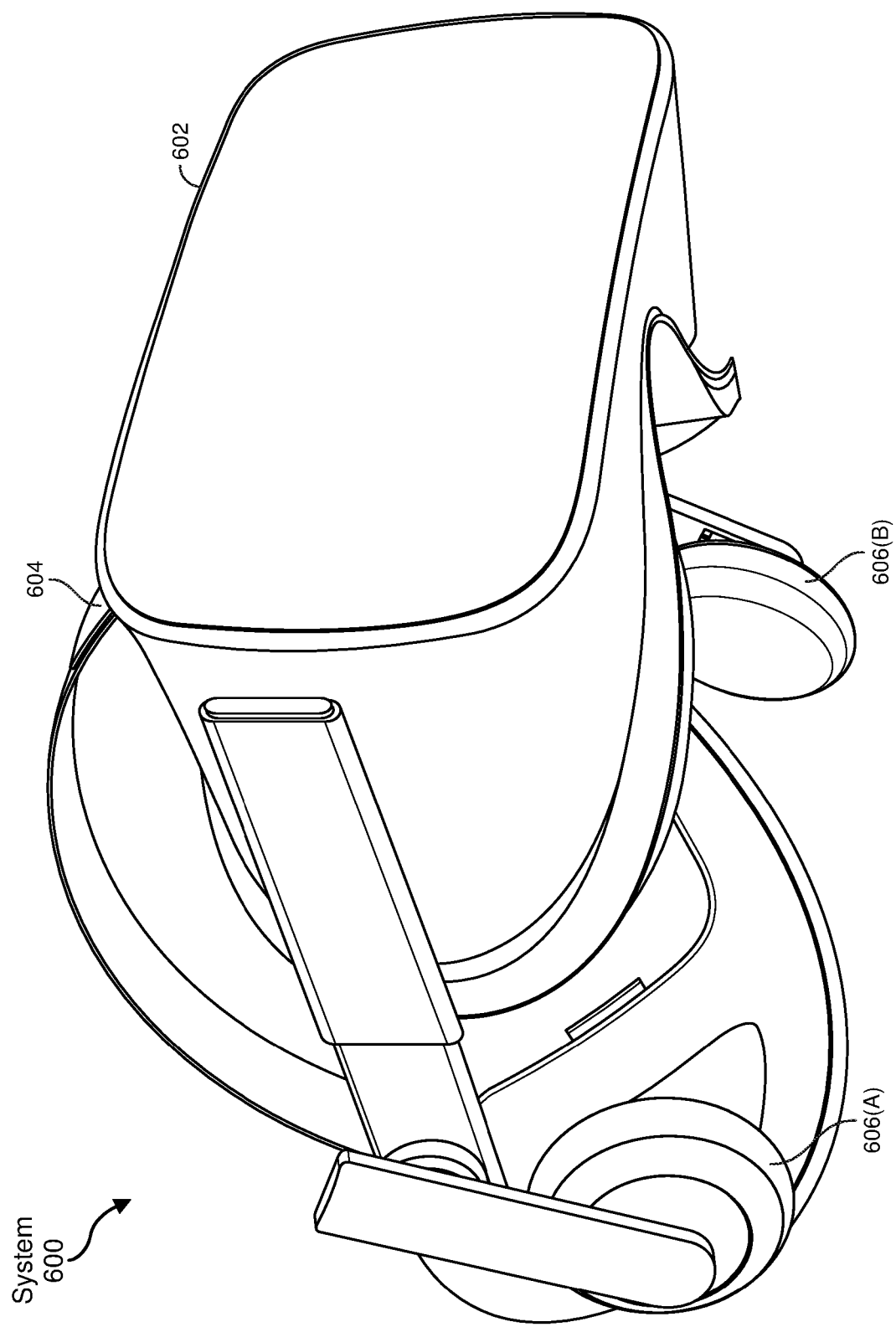
FIG. 6 is an illustration of an exemplary virtual-reality headset that may be used in connection with embodiments of this disclosure.

Head-mounted display 802 generally represents any type or form of virtual-reality system, such as virtual-reality system 600 in FIG. 6. Haptic device 804 generally represents any type or form of wearable device, worn by a user of an artificial-reality system, that provides haptic feedback to the user to give the user the perception that he or she is physically engaging with a virtual object. In some embodiments, haptic device 804 may provide haptic feedback by applying vibration, motion, and/or force to the user. For example, haptic device 804 may limit or augment a user's movement. To give a specific example, haptic device 804 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 804 to send action requests to a console. Examples of action requests include, without limitation, requests to start an application and/or end the application and/or requests to perform a particular action within the application.

Figure 9:
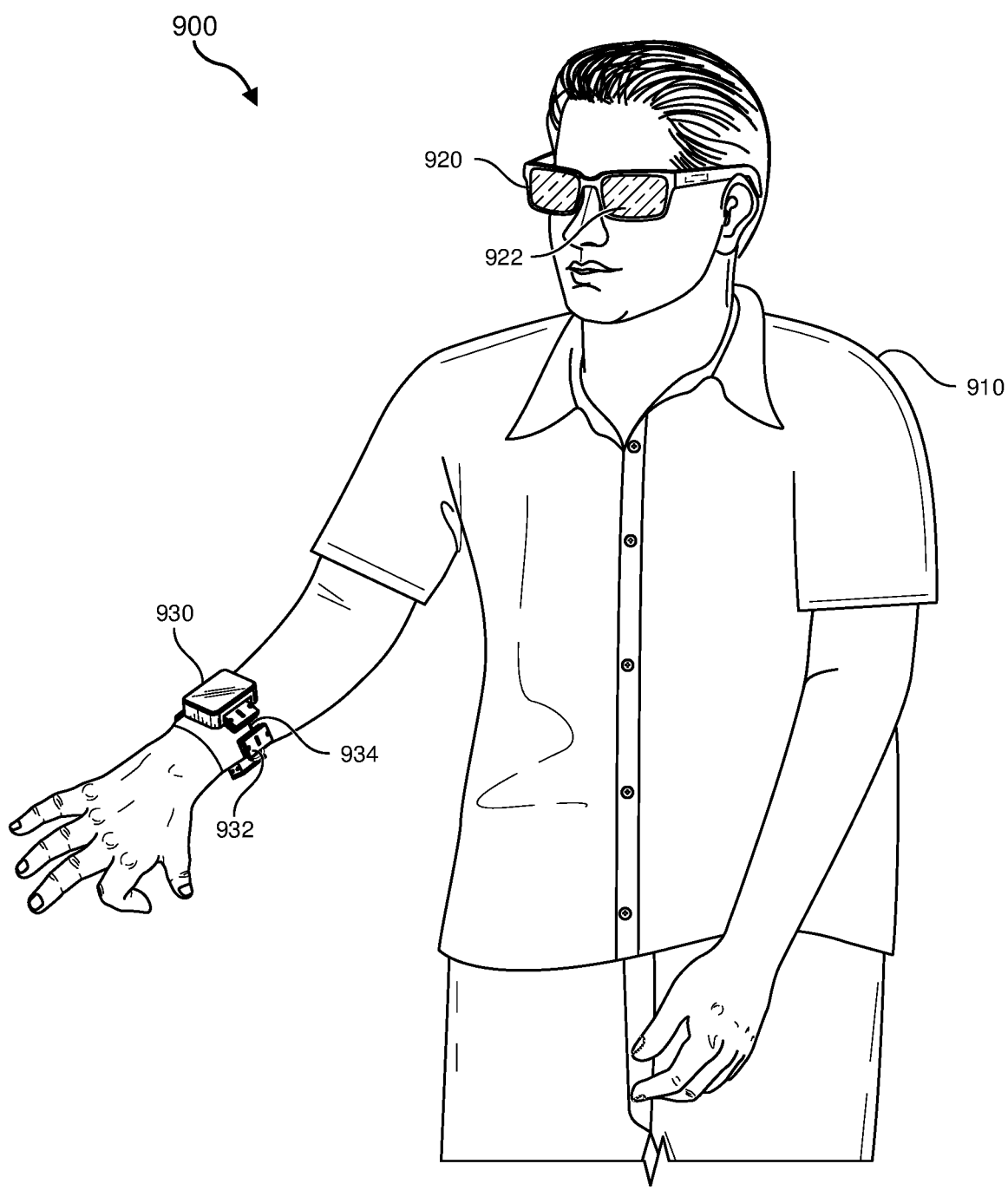
FIG. 9 is an illustration of an exemplary augmented-reality environment according to embodiments of this disclosure.

While haptic interfaces may be used with virtual-reality systems, as shown in FIG. 8, haptic interfaces may also be used with augmented-reality systems, as shown in FIG. 9. FIG. 9 is a perspective view of a user 910 interacting with an augmented-reality system 900. In this example, user 910 may wear a pair of augmented-reality glasses 920 that may have one or more displays 922 and that are paired with a haptic device 930. In this example, haptic device 930 may be a wristband that includes a plurality of band elements 932 and a tensioning mechanism 934 that connects band elements 932 to one another.

One or more of band elements 932 may include any type or form of actuator suitable for providing haptic feedback. For example, one or more of band elements 932 may be configured to provide one or more of various types of cutaneous feedback, including vibration, force, traction, texture, and/or temperature. To provide such feedback, band elements 932 may include one or more of various types of actuators. In one example, each of band elements 932 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 710, 720, 804, and 930 may include any suitable number and/or type of haptic transducer, sensor, and/or feedback mechanism. For example, haptic devices 710, 720, 804, and 930 may include one or more mechanical transducers, piezoelectric transducers, and/or fluidic transducers. Haptic devices 710, 720, 804, and 930 may also include various combinations of different types and forms of transducers that work together or independently to enhance a user's artificial-reality experience. In one example, each of band elements 932 of haptic device 930 may include a vibrotactor (e.g., a vibrotactile actuator) configured to vibrate in unison or independently to provide one or more of various types of haptic sensations to a user.

The present disclosure is generally directed to devices and methods for enlarging the interaction space for users by enabling any suitable surface (e.g., a table, clothing, an object, etc.) to function as an input device/surface for an artificial reality application. Embodiments operate to reliably detect if a user is contacting a surface and, in some embodiments, to also reliably determine where the user is contacting an un-instrumented surface when the user's hand is resting on the surface. In some embodiments, this is accomplished using a wristband equipped with an ultrasound transmitter, an ultrasound receiver, and data processing capabilities.

EXAMPLE EMBODIMENTS

Example 1: A wearable device including a transmitting component coupled to the wearable device and configured to transmit a signal along a surface, a receiving component coupled to the wearable device and configured to detect the signal, and a controller programmed to determine that a user contacted the surface by determining that the signal propagated from the transmitting component to the receiving component via an indirect path.

Example 2: The wearable device of Example 1, wherein the controller is programmed to determine that the signal propagated from the transmitting component to the receiving component via an indirect path by determining that a time period between transmitting the signal and detecting the signal is greater than a time period for the signal to propagate directly between the transmitting component and the receiving component.

Example 3: The wearable device of Example 1, wherein the controller is programmed to determine that the signal propagated from the transmitting component to the receiving component via an indirect path by determining that the signal was detected at the receiving component at a first time after the transmitting component transmitted the signal and that the signal was detected at the receiving component at a second time after the transmitting component transmitted the signal.

Example 4: The wearable device of Example 1, wherein the transmitting component comprises an ultrasound transmitter and the receiving component comprises an ultrasound receiver.

Example 5: The wearable device of Example 1, further comprising a second transmitting component operable to transmit an indication that the user contacted the surface to a second device, the second device using the indication to determine an intended interaction of the user with a user interface.

Example 6: The wearable device of Example 5, wherein the second device comprises an artificial reality headset and the intended interaction comprises an intended interaction with artificial reality content.

Example 7: The wearable device of Example 6, wherein the controller further causes an optical sensor to acquire data used to determine a location where the user contacted the surface and the headset alters the experience of the user wearing the headset based on the determined location.

Example 8: A system may include a headset operable to generate an artificial reality experience for a user, a wearable device, a first transmitting component coupled to the wearable device and configured to transmit a signal along a surface, a receiving component coupled to the wearable device and configured to detect the signal, a controller programmed to determine that a user contacted the surface by determining that the signal propagated from the first transmitting component to the receiving component via an indirect path, and a second transmitting component operable to transmit an indication to the headset that the user contacted the surface.

Example 9: The system of Example 8, wherein the controller is programmed to determine that the signal propagated from the first transmitting component to the receiving component via an indirect path by determining that a time period between transmitting the signal and detecting the signal is greater than a time period for the signal to propagate directly between the first transmitting component and the receiving component.

Example 10: The system of Example 8, wherein the controller is programmed to determine that the signal propagated from the first transmitting component to the receiving component via an indirect path by determining that the signal was detected at the receiving component at a first time after the first transmitting component transmitted the signal and that the signal was detected at the receiving component at a second time after the first transmitting component transmitted the signal.

Example 11: The system of Example 8, wherein the first transmitting component comprises an ultrasound transmitter and the receiving component comprises an ultrasound receiver.

Example 12: The system of Example 8, wherein the controller further causes the system to cause an optical sensor to acquire data used to determine a location where the user contacted the surface and the headset alters the experience of the user wearing the headset based on the determined location.

Example 13: The system of Example 11, wherein the wearable device is a wristband, and the ultrasound transmitter is positioned to be placed in contact with the surface.

Example 14: A method may include operating a first transmitter to transmit a signal, detecting a received signal corresponding to the transmitted signal at a receiver, determining that a user contacted a surface by determining that the signal propagated from the first transmitter to the receiver via an indirect path, and operating a second transmitter to transmit an indication that the user contacted the surface to a device, the device using the indication to determine the user's intended interaction with a user interface.

Example 15: The method of Example 14, wherein determining that the signal propagated from the first transmitter to the receiver via an indirect path further comprises determining that a time period between transmitting the signal and detecting the signal is greater than a time period for the signal to propagate directly between the first transmitter and the receiver.

Example 16: The method of Example 14, wherein determining that the signal propagated from the first transmitter to the receiver via an indirect path further comprises determining that the signal was detected at the receiver at a first time after the first transmitter transmitted the signal and that the signal was detected at the receiver at a second time after the first transmitter transmitted the signal.

Example 17: The method of Example 14, wherein the first transmitter comprises an ultrasound transmitter and the receiver comprises an ultrasound receiver.

Example 18: The method of Example 14, wherein the device is a virtual reality headset, and the method further comprises operating a sensor to acquire data, determining the location of the user's contact with the surface based on the acquired data, and based on the user's determined location, altering the virtual reality environment experienced by the user.

Example 19: The method of Example 18, wherein the sensor comprises an optical sensor of a hand tracking subsystem.

Example 20: The method of Example 14, further comprising determining a characteristic of the surface by processing the received signal and modifying a characteristic of the transmitted signal based on the characteristic of the surface.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a signal, process the signal, and based on the processing, generate an indication that a user contacted a surface. The indication of a surface contact may cause a sensor to acquire additional data that is used to determine where a user contacted a surface, and based on that, the user's intended interaction with a user interface. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A wearable device, comprising:
    a wristband having a bottom side configured to be worn proximate to an inner portion of a user's wrist;
    a transmitting component coupled to the wearable device and configured to propagate a transmitted signal;
    a receiving component coupled to the wearable device and configured to receive the transmitted signal after the transmitted signal has propagated along one or more paths, wherein one of the transmitting component or the receiving component is located on the bottom side of the wristband;
    a signal processor programmed to:
        determine that a first received signal received at the receiving component corresponds to the transmitted signal propagated along a direct path between the transmitting component and the receiving component; and
        determine that a second received signal received at the receiving component corresponds to the transmitted signal propagated along a longer indirect path between the transmitting component and the receiving component, the longer indirect path passing along or through a surface object; and
    a controller programmed to detect when a user contacts the surface object based at least in part on the transmitted signal having propagated from the transmitting component to the receiving component along both the direct path and the longer indirect path that passes along or through the surface object.

2. The wearable device of claim 1, wherein:
    the transmitting component is located on the bottom side of the wristband;
    the receiving component is located on a top side of the wristband;
    the direct path passes between the transmitting component and the receiving component directly through the wristband; and
    the signal processor is further programmed to determine that the transmitted signal has propagated from the transmitting component to the receiving component through the surface object along the longer indirect path by determining that a time period between propagating the transmitted signal and detecting the transmitted signal as the second received signal is greater than a time period for the transmitted signal to propagate directly between the transmitting component and the receiving component through the wristband.

3. The wearable device of claim 1, wherein the signal processor is further programmed to determine that the transmitted signal has propagated from the transmitting component to the receiving component along both the direct path and the longer indirect path by determining that the transmitted signal was detected as the first received signal at the receiving component at a first time after the transmitting component propagated the transmitted signal and that the transmitted signal was detected as the second received signal at the receiving component at a second time after the transmitting component propagated the transmitted signal.

4. The wearable device of claim 1, wherein the transmitting component comprises an ultrasound transmitter and the receiving component comprises an ultrasound receiver.

5. The wearable device of claim 1, further comprising a second transmitting component operable to transmit an indication that the user contacted the surface object to a second device, the second device using the indication to determine an intended interaction of the user with a user interface.

6. The wearable device of claim 5, wherein:
    the second device comprises an artificial reality headset; and
    the intended interaction comprises an intended interaction with artificial reality content.

7. The wearable device of claim 6, wherein:
    the controller further causes an optical sensor to acquire data used to determine a location where the user contacted the surface object; and
    the headset alters the experience of the user wearing the headset based on the determined location.

8. A system, comprising:
    a headset operable to generate an artificial reality experience for a user;

a wearable device having a wristband, the wristband having a bottom side configured to be worn proximate to an inner portion of a wrist of the user;

a first transmitting component coupled to the wearable device and configured to propagate a transmitted signal;

a receiving component coupled to the wearable device and configured to receive the transmitted signal after the transmitted signal has propagated along one or more paths, wherein one of the transmitting component or the receiving component is located on the bottom side of the wristband;

a signal processor programmed to:
  determine that a first received signal received at the receiving component corresponds to: the transmitted signal after the transmitted signal has propagated along a direct path between the first transmitting component and the receiving component; and
  determine that a second received signal received at the receiving component corresponds to the transmitted signal after the transmitted signal has propagated along a longer indirect path between the first transmitting component and the receiving component, the longer indirect path passing along or through a surface object;

a controller programmed to detect when a user contacts the surface object based at least in part on that the transmitted signal having propagated from the first transmitting component to the receiving component along both the direct path and the longer indirect path that passes along or through the surface object; and a second transmitting component operable to transmit an indication to the headset that the user contacted the surface object.

9. The system of claim 8, wherein the signal processor is programmed to determine that the transmitted signal has propagated from the first transmitting component to the receiving component through the surface object by determining that a time period between transmitting the transmitted signal and detecting the transmitted signal as the second received signal is greater than a time period for the transmitted signal to propagate directly between the first transmitting component and the receiving component.

10. The system of claim 8, wherein the signal processor is programmed to determine that the transmitted signal has propagated from the first transmitting component to the receiving component along both the direct path and the longer indirect path by determining that the transmitted signal was detected at the receiving component as the first received signal at a first time after the first transmitting component propagated the transmitted signal and that the transmitted signal was detected as the second received signal at the receiving component at a second time after the first transmitting component propagated the transmitted signal.

11. The system of claim 8, wherein the first transmitting component comprises an ultrasound transmitter and the receiving component comprises an ultrasound receiver.

12. The system of claim 8, wherein:
the controller further causes the system to cause an optical sensor to acquire data used to determine a location where the user contacted the surface object; and
the headset alters the experience of the user wearing the headset based on the determined location.

13. The system of claim 11, wherein:
the ultrasound transmitter is positioned on the wristband to be placed in contact with the surface object; and
the ultrasound receiver is positioned on the wristband such that a return path of the transmitted signal passes through the user's hand.

14. A method, comprising:
operating a first transmitter of a wearable device to propagate a transmitted signal, wherein:
  the wearable device comprises a wristband; and
  the first transmitter is located on a bottom side of the wristband;
detecting a first received signal corresponding to the transmitted signal at a receiver of the wearable device;
detecting a second received signal corresponding to the transmitted signal at the receiver;
detecting when a user contacted a surface object by determining that:
  the first received signal corresponds to the transmitted signal having propagated from the first transmitter to the receiver along a direct path between the first transmitter and the receiver; and
  the second received signal corresponds to the transmitted signal having propagated from the first transmitter to the receiver along a longer indirect path between the first transmitter and the receiver, the longer indirect path passing along or through the surface object; and
operating a second transmitter to transmit an indication that the user contacted the surface object to a second device, the second device using the indication to determine the user's intended interaction with a user interface.

15. The method of claim 14, wherein determining that the second received signal corresponds to the transmitted signal having propagated from the first transmitter to the receiver through the surface object comprises determining that a time period between propagating the transmitted signal and detecting the second received signal is greater than a time period for the transmitted signal to propagate directly between the first transmitter and the receiver.

16. The method of claim 14, wherein determining that the second received signal corresponds to the transmitted signal having propagated from the first transmitter to the receiver along the longer indirect path comprises determining that the transmitted signal was detected at the receiver at a first time after the first transmitter propagated the transmitted signal and that the transmitted signal was detected at the receiver at a second time after the first transmitter propagated the transmitted signal.

17. The method of claim 14, wherein the first transmitter comprises an ultrasound transmitter and the receiver comprises an ultrasound receiver.

18. The method of claim 14, wherein the second device is a virtual reality headset capable of presenting a virtual reality environment to the user, and the method further comprises:
operating a sensor to acquire data;
determining the location of the user's contact with the surface object based on the acquired data; and
based on the user's determined location, altering the virtual reality environment experienced by the user.

19. The method of claim 18, wherein the sensor comprises an optical sensor of a hand tracking subsystem.

20. The method of claim 14, further comprising:
determining a characteristic of the surface object by processing the first received signal or the second received signal; and modifying a characteristic of the transmitted signal based on the characteristic of the surface object.

* * * * *